United States Patent [19]

Clasen et al.

[11] 3,959,001
[45] May 25, 1976

[54] METHOD OF PREPARING AN ELECTRICALLY INSULATING EMBEDDING COMPOSITION

[75] Inventors: Helmut Clasen, Niederkassel-Ranzel; Klaus Deneke, Troisdorf-Spich, both of Germany

[73] Assignee: Dynamit Nobel Aktiengesellschaft, Troisdorf, Germany

[22] Filed: Dec. 17, 1974

[21] Appl. No.: 533,737

[30] Foreign Application Priority Data

Dec. 21, 1973 Germany............................ 2363790

[52] U.S. Cl.................................... 106/60; 106/62
[51] Int. Cl.² ........................................ C04B 35/04
[58] Field of Search................................ 106/60, 62

[56] References Cited
UNITED STATES PATENTS

| | | | |
|---|---|---|---|
| 1,965,605 | 7/1934 | McCaughey et al. | 106/60 |
| 2,280,515 | 4/1942 | Ridgway et al. | 106/60 |
| 2,280,516 | 4/1942 | Ridgway et al. | 106/60 |
| 2,599,184 | 6/1952 | Lathe | 106/62 |
| 3,369,209 | 2/1968 | Edwin et al. | 106/60 |

Primary Examiner—J. Poer
Attorney, Agent, or Firm—Burgess, Dinklage & Sprung

[57] ABSTRACT

A thermally conductive refractory electrical insulating embedding composition comprising granular magnesium oxide and granular fused magnesium iron alumino silicate; and electrical heating assembly having an electrically conductive heating member and a jacket and disposed between said member and said jacket a thermally conductive refractory electrically insulating embedding composition comprising granular magnesium oxide and granular fused magnesium iron alumino silicate.

7 Claims, No Drawings

3,959,001

METHOD OF PREPARING AN ELECTRICALLY INSULATING EMBEDDING COMPOSITION

BACKGROUND OF THE INVENTION

1. Field of the Invention

This invention relates to a thermally conductive refractory electrical insulating embedding composition. More particularly, this invention relates to a thermally conductive refractory electrical insulating embedding composition containing magnesium oxide. More especially this invention relates to such an embedding composition which when employed in a heating assembly such as one containing electrical heating coils has improved electrical insulating properties and more especially has good physical properties whereby sintering of the composition does not occur during use. This invention also relates to an electrical heating assembly utilizing such thermally conductive refractory electrical insulating embedding composition.

DISCUSSION OF THE PRIOR ART

It is known to use granulated fused or sintered magnesium oxide as an electrical insulating material between voltage-carrying heating coils and the tubular jackets in electrical tubular heating elements for the electrical heating and household appliance industry. In addition to a high electrical resistance, magnesium oxide, especially fused magnesium oxide, also possesses a good thermal conductivity. The Joulean heat produced in the heating conductor is easily carried to the outer jacketing for economical utilization. In the case of higher thermal stress, i.e., in the case of higher temperatures of use, say 800°C and above however, the electrical insulating ability diminishes greatly on account of the steep rise in the electrical conductivity of magnesium oxide.

Attempts have been made to eliminate this deficiency which limits the use of fused or sintered magnesia as an electrical insulating material for heating elements subject to great stresses. Heat treating the granulated insulating material generally produces an improvement of the insulation; on the other hand, the mechanical stresses involved in the production of the heating elements produce flaws and hence charge carriers for the transport of the current, so that only a slight improvement in insulating performance results. It can, furthermore, be assumed that heavy metal traces from the metal parts of the heating element diffuse into the magnesium oxide and then act as "doping" to diminish the resistance. This negative effect is not eliminated by heat treatment after granulation.

To improve the electrical resistance it has also been proposed to add to the granulated fused magnesium oxide for tubular heating elements additives which act in part as lubricants, thereby forestalling destruction of the granules during the compression process involved in the production of the tubular heating elements. The following, for example, have been proposed as additives: mica, talc, steatite, and also, for example, magnesium silicate which has been produced by the sintering talc, for example, followed by crushing.

The relative improvement which is achieved by these known admixtures is based essentially on an increase in the thermal conductivity of the insulating compositions. Since this reduces the average temperature of the insulating material, the electrical resistance can also increase on account of the high negative temperature coefficient, and may even outweigh the unfavorable influence of certain admixtures on the electrical insulating properties. The improvement in heat removal provided by the insulating composition is to be attributed to the fact that these admixtures, especially at higher temperatures, promote the sintering of the composition. In some admixtures, phase transformations in the direction of higher molecular volumes take place at higher temperatures of use. The high densification and hardening of the insulating composition that takes place in this manner entails, however, serious disadvantages with regard to mechanical properties. For example, the bending strength of the usually tubular heating elements is greatly impaired. Also, the clearance between the usually thin heater conductors and the insulating composition, which is necessary on account of thermal expansion, is restricted, which often results in the breaking of the heating wires. It has also been proposed to use quartz, mullite or zirconium sand as admixtures to commercial magnesia. Such embedding compositions, however, are not satisfactory in practice with regard to their electrical insulation performance.

It is an object of this invention, therefore, to provide a thermally conductive, refractory, electrically insulating embedding composition which can be used in heating coil assemblies at higher temperatures whereby the electrical conductivity does not increase extremely. It is a further object of this invention, therefore, to improve the properties of magnesium oxide embedding compositions to render them less electrically conducting at high temperature levels while providing heating assemblies such as heating coil assemblies containing such compositions with good physical properties, particularly bending strength. It is a further object of this invention, therefore, to provide a composition of magnesium oxide and another magnesium oxide containing substance which when employed has an embedding composition in a heating coil assembly does not sinter during use.

SUMMARY OF THE INVENTION

The objects of the present invention are provided by a thermally conductive, refractory, electrical insulating embedding composition comprising granular magnesium oxide and granular fused magnesium iron alumino silicate. In accordance with the present invention it has been found that an improved thermally conductive refractory electrical insulating composition containing magnesium oxide is provided when to the magnesium oxide there is added a minor quantity of a granular fused magnesium iron alumino silicate. The magnesium iron alumino-silicate is generally present in the embedding composition in an amount between 0.5 and 4%, based on the weight of the magnesium oxide, preferably between 1 and 2 weight percent. The magnesium iron alumino silicate is generally one which has been granulated so that the grain size is less than 0.4 mm. and preferably less than 0.1 mm. The same can contain up to about 5 weight percent calcium oxide without any detriment.

At the heart of the present invention there is the use of this minor quantity of granular fused magnesium iron alumino silicate. This material, particularly when in the form of a homogeneous fused magnesium iron alumino silicate provides optimum properties to the magnesium oxide containing embedding composition.

It has been found that by the addition of the granulated fused magnesium iron alumino silicate that the electrical insulating performance is surprisingly improved without the occurrence of any perceptible sintering and/or compacting during use. Moreover, the composition can be employed successively as an embedding composition even at higher temperatures of use, say, at temperatures above about 800°C. Whereas the magnesium oxide compositions of the prior art in many instances could not be advantageously used at temperatures above, say, 800°C owing to the steep rise in electrical conductivity of the magnesium oxide, the present composition does not suffer from such disadvantages and enables the construction of an electrical heating assembly which can be employed over a wide range of temperatures.

The magnesium iron alumino silicates of the present invention can have the components thereof present over a wide range. Generally speaking, the magnesium oxide, iron oxide, alumina and silica in the fused magnesium iron alumino silicate possess a composition falling within the following ranges:

| Composition | Broad Range | Preferred Range |
|---|---|---|
| silica | 40 to 75 | 45 to 65 |
| alumina | 15 to 35 | 20 to 30 |
| MgO | 5 to 25 | 10 to 20 |
| FeO | 5 to 20 | 10 to 15 |

The fused magnesium iron alumino silicates are generally those obtained by heating together a source of magnesium oxide, iron oxide, alumina and silica in the melt such as in an arc furnace. The resultant melt is then subjected to a cooling operation, as by quenching, such that the temperature of the melt drops rapidly at a rate of at least 80°C per minute. This process provides a fused magnesium iron alumino silicate of excellent thermal and electrical properties which is characterized by a marked degree of homogeneity. The degree of homogeneity of the composition is at least about 95%, i.e., no more than 5% of the composition differs in physical and/or chemical properties from the balance of the fused magnesium iron alumino-slicate.

In use so-formed fused magnesium iron alumino silicate is granulated to a grain size of less than 0.4 mm. The same is then mixed with granular magnesium oxide prior to use, for example, in a tubular heating element, heating cartridge or the like. The manner by which the alumino-silicate is used in the resulting embedding composition is not particularly critical. The magnesium iron alumino silicate should be intimately incorporated with the granulated magnesium oxide to form a generally homogeneous mixture and the same is thereafter incorporated in the heating assembly in known manner.

DESCRIPTION OF PREFERRED EMBODIMENTS

It has been found, in accordance with the present invention, than when such an embedding composition containing granulated fused magnesium iron alumino-silicate is employed in a heating element, even a heating element filled with an embedding composition which has undergone a comparatively slight compression and thus has a poorer thermal conduction in a higher temperature in the insulating composition that the electrical resistance is improved, especially in the case of high temperatures of use of greater than 800°C. Of course, for the achievement of the optimum effect, it is important that the magnesium iron alumino silicate to be added in accordance with the invention be of the most uniform composition possible. This homogeneity can be achieved if the preparation of the magnesium iron alumino-silicate is carried out as briefly outlined above by charging the source of the components into an arc furnace and effecting melting therein, preferably under reducing conditions. The melt is then rapidly cooled (at a rate of at least 80°C per minute) as by quenching. In this manner, a homogeneous, glassy mass is obtained without separation of the components by segregation, for example.

Fundamentally, it is possible, in an additional process step, for example, to bring the glassy mass to crystallization, for example by heat treatment. This, however, produces no important effect. Homogeneity appears to be of considerable importance to the desired effect, but it is not clear how the effect is achieved.

A preferred embodiment of the invention, therefore, consists in the admixture of magnesium iron aluminum silicates which have been prepared by rapid chilling of the melt followed by crushing.

For the rapid chilling or quenching of the melt, methods may be used which are known in the preparation of other refractory products, such as zirconium corundum for example. For example, the melt can be poured into a mold which is filled with metallic, preferably spherical ferro-magnetic cooling bodies (see for example German Offenlegungsschrift 2,107,455). The cooled material can be separated from the metallic cooling bodies by magnetic methods. Also, the melt can be poured into small metallic molds having thick walls, the weight ratio of the metal mold to the melt being at least 3 : 1. Basically, any technique can be used whereby rapid cooling or quenching is achieved.

The rapid cooling causes the magnesium iron aluminum silicate to solidify in a glassy form, entirely or at least partially. It will correspond in its chemical composition approximately to the cordierite compositions, with 45 to 70 weight percent $SiO_2$, 15 to 35 weight percent $Al_2O_3$ and 10 to 25 weight percent MgO, approximately up to 70 weight percent, preferably 20 to 50 weight percent, of the magnesium oxide being replaced by iron oxide reckoned as FeO. If desired, the magnesium oxide can contain up to about 5 weight percent of CaO.

Surprisingly, the iron oxide in the admixture of the invention results in a considerable increase in the electrical resistance of the entire embedding composition. This effect could not have been foreseen, since according to generally prevailing teaching, heavy metal compounds are to be avoided in electrical insulating embedding compositions on account of their higher conductivity.

As it will be seen in the examples, where embedding compositions with and without the admixture of the substances of the invention are compared, the virtually identical temperature gradient through the insulating layer shows that greater thermal conduction, due to sintering for example, is not achieved. The reason for this is not clear. Possibly this surprising effect can be explained by a specific reduction of flaws by secondary reactions in the insulating composition.

The preferred principal component of the embedding composition of the invention is a granulated fused magnesium oxide which can be produced economically from minerals or salts occurring in nature; for example, it can be prepared by the calcination of magnesite ($MgCO_3$), followed by fusing and crushing to grain sizes smaller than, say, 0.4 millimeter.

The chemical composition of such a magnesium oxide will vary between, say, the following limits:

| | Percentage by Weight |
|---|---|
| MgO | 94 to 98 |
| $SiO_2$ | 1.0 to 3.5 |
| CaO | 0.5 to 2.0 |
| $Al_2O_3$ | 0.02 to 0.25 |
| $Fe_2O_3$ | 0.01 to 0.10 |
| NiO | 0.01 to 0.03 |

In some cases, traces of $SO_3$, Cl, $B_2O_3$, $TiO_2$, $Na_2O$ or $L_2O$ will be present. The grain size distribution of the commercial magnesium oxides runs between about 0.01 and 0.37 mm, with sizes above, say, 0.12 mm greatly predominating.

Instead of granulated fused magnesium oxide, sintered magnesium oxide, for example, can also be used. For example, it is possible to begin with *magnesia usta* (a very finely divided magnesium oxide prepared by chemical methods through precipitaton, usually with grain sizes under 5 microns), which is pelletized and sintered at temperatures of about 1500° to 2000°C. The pellets are then crushed to the desired grain sizes.

For the preparation of the magnesium iron aluminum silicates to be added in accordance with the invention, a great variety of raw materials, as source material, can be mixed, fused, chilled and crushed. For example, clays and natural aluminum silicates for $Al_2O_3$ and $SiO_2$, quartz sand and calcined magnesites of dolomitic origin or from sea water can be used. Iron, as a frequent impurity in natural raw materials, does not harm. The same is the case with lime, amounts of up to about 5 weight percent CaO (with respect to MgO) being acceptable without loss of quality. Neither do small amounts of alkali oxides or of other metal oxide impurities cause any difficulty, in general.

Bayer alumina, quartz sand (99% $SiO_2$, by weight) and calcined magnesites are used preferentially as raw materials. Iron oxide red (an $Fe_2O_3$ obtained by chemical methods) is preferred as the iron oxide to be added. Fundamentally, other iron oxides may also be used, such as FeO or $Fe_3O_4$ or mixtures of various iron oxides.

The fused magnesium iron aluminum silicate to be added in accordance with the invention is crushed, after cooling, to grain sizes smaller than 0.4 and preferably smaller than 0.1 mm, in a known manner, and is admixed with the magnesium oxide in amounts of 0.5 to 4%, preferably 1 to 2%, by weight, without further treatment.

In order to more fully illustrate the nature of the invention and the manner of practicing the same the following examples are presented.

EXAMPLES

In the following examples, two cordierite glasses of different composition are used as additives in accordance with the invention. The batches were melted in the carbon arc furnace. The melt was poured into small, flat, thickwalled metal molds (ratio of weight of metal mold to melt = 5 : 1) and, after cooling, crushed to grain sizes smaller than 0.12 mm.

The magnesium iron alumina silicates thus obtained were mixed with two batches of commercial fused magnesia having grain sizes smaller than 0.4 mm, in a proportion of 2% by weight. The two batches of fused magnesia have been obtained from calcined magnesite. Their chemical composition was as follows:

| | Percentage by weight |
|---|---|
| MgO | 94 to 98 |
| $SiO_2$ | 1.0 to 3.5 |
| CaO | 0.5 to 2.0 |
| $Al_2O_3$ | 0.02 to 0.25 |
| $Fe_2O_3$ | 0.01 to 0.10 |
| NiO | 0.01 to 0.03 |

It had been prepared by the calcination of magnesite followed by fusing and crushing to a grain size smaller than 0.4 mm. Several batches were prepared to determine the effect of the magnesium iron alumino silicates on an embedding composition having as its principal component magnesium oxide. As the table below shows, the two batches differ in their insulation values. There is also shown the values measured on commercial types of magnesia in respect of these properties.

The properties of the embedding compositions of the invention were tested as follows, and were compared with an embedding composition consisting of the same fused magnesia charge, but one which did not contain the cordieriete admixture of the invention. As it can be seen in the table, the specific resistance ($\Omega$ . cm) is increased by at least one order of magnitude by the additive of the invention. As it appears from the table, the additive of the invention produces an increase in the specific resistance of at least one order of magnitude even in batches of fused magnesia of very different quality.

A special measuring cell constructed in the manner, of a section of a tubular heating element was used for determining the specific resistance. The outside diameter of the tubular jacket (length 200 mm) amounted to 8.6 mm after the insulating composition had been compressed to approximately 3.1 g/cm³ by hammering to a hoop. The heating conductor consisted of a capillary tube with an outside diameter of 2.7 mm, and permitted the inside temperature to be measured with a thermocouple. The outside temperature was measured by means of spot-welded thermocouples as the jacket temperature to which the measured resistances refer. The average temperature of the insulating composition is between the outside and the inside temperature. The heating was performed at 3 to 7 volts alternating current at 40 to 85 amperes. The measuring voltage was 220 volts. The current between the heating conductor and the jacket was measured, and the specific resistance (impedance) was computed on that basis at a known cell constant.

Prior to each measurement, the measuring cell was operated for 4 to 5 hours at a surface temperature of about 900°C.

EXAMPLE 1

The following mixture was used as described above for the preparation of the cordierite glasses, which were used as an additive as described above. The results of the tests are shown in the table.

Mixture: 10 weight parts highly calcined seawater magnesite composed of 95 weight percent MgO, approximately 2 weight percent CaO, 2 weight percent $SiO_2$ and 1 weight percent $Fe_2O_3$, 30 weight parts of Bayer alumina containing 0.3 weight percent of $Na_2O$, 48 weight parts of quartz sand containing 99 weight percent $SiO_2$, and 12 parts of iron oxide red ($Fe_2O_3$).

EXAMPLE 2

Another batch was composed as follows and used in the same manner as described above. The results of the tests are shown in the table.

Mixture: 7 weight parts calcined dolomitic magnesite composed of 94 weight percent MgO, approximately 4 weight percent $SiO_2$ and 2 weight percent CaO, 32 weight parts Bayer alumina containing 0.3 weight percent $Na_2O$, 52 weight parts quartz sand containing 99 weight percent $SiO_2$, and 7 weight parts technical iron oxide ($Fe_2O_3$).

TABLE

| Jacket Temperature | Example 1 | | | Example 2 | | |
|---|---|---|---|---|---|---|
| | 700° | 800° | 900° | 700° | 800° | 900° |
| Without Additive | | | | | | |
| specific resistance Ωcm. | $1.02 \cdot 10^8$ | $1.70 \cdot 10^7$ | $1.81 \cdot 10^6$ | $4.44 \cdot 10^7$ | $6.12 \cdot 10^6$ | $1.12 \cdot 10^6$ |
| temperature difference | 100° | 145° | 210° | 105° | 160° | 235° |
| With Additive | | | | | | |
| specific resistance Ωcm. | $1.42 \cdot 10^9$ | $4.47 \cdot 10^8$ | $4.71 \cdot 10^7$ | $1.24 \cdot 10^9$ | $3.33 \cdot 10^8$ | $2.74 \cdot 10^7$ |
| temperature difference | 95° | 140° | 205° | 115° | 160° | 230° |

What is claimed is:

1. A thermally conductive refractory electrical insulating embedding composition comprising granular magnesium oxide and granular fused magnesium iron alumino silicate said magnesium iron alumino silicate being present in said composition in an amount of 0.5 to 4% based on the weight of said magnesium oxide, said magnesium iron alumino silicate having a composition as follows:

| | |
|---|---|
| silica | 40 to 75 |
| alumina | 15 to 35 |
| MgO | 5 to 25 |
| FeO | 5 to 20 |

2. An embedding composition according to claim 1 wherein said magnesium iron alumino silicate is present in said composition in an amount of 1 to 2 weight percent, based on the weight of said magnesium oxide.

3. An embedding composition according to claim 1 wherein said magnesium iron alumino silicate has a composition as follows:

| | |
|---|---|
| silica | 45 to 65 |
| alumina | 20 to 30 |
| MgO | 10 to 20 |
| FeO | 10 to 15 |

4. An embedding composition according to claim 1 wherein said magnesium iron alumino silicate has a grain size of less than 0.4 mm.

5. An embedding composition according to claim 1 wherein said magnesium iron alumino silicate has a grain size of less than 0.1 mm.

6. An embedding composition according to claim 1 wherein said magnesium iron alumino silicate contains up to 5% by weight calcium oxide.

7. An embedding composition according to claim 1 wherein said magnesium iron alumino silicate is homogeneous.

* * * * *

UNITED STATES PATENT AND TRADEMARK OFFICE
CERTIFICATE OF CORRECTION

PATENT NO. : 3,959,001
DATED : May 25, 1976
INVENTOR(S) : Helmut Clasen et al

It is certified that error appears in the above-identified patent and that said Letters Patent are hereby corrected as shown below:

Column 1, line 62, before "talc" insert -- of --.

Column 5, line 13, change "$L_2O$" to read -- $K_2O$ --.

Signed and Sealed this

Thirty-first Day of August 1976

[SEAL]

Attest:

RUTH C. MASON
*Attesting Officer*

C. MARSHALL DANN
*Commissioner of Patents and Trademarks*